US010192265B2

(12) United States Patent
Carragher

(10) Patent No.: US 10,192,265 B2
(45) Date of Patent: *Jan. 29, 2019

(54) METHOD FOR GENERATING DYNAMIC AND COLLABORATIVE PRICING OFFERS IN A FINANCIAL PLATFORM ENVIRONMENT

(71) Applicant: H.O.M.E. Mortgage Card, LLC, Glencoe, IL (US)

(72) Inventor: Philip Carragher, Glencoe, IL (US)

(73) Assignee: H.O.M.E. Mortgage Card, LLC, Glencoe, IL (US)

( * ) Notice: Subject to any disclaimer, the term of this patent is extended or adjusted under 35 U.S.C. 154(b) by 1244 days.

This patent is subject to a terminal disclaimer.

(21) Appl. No.: 13/794,234

(22) Filed: Mar. 11, 2013

(65) Prior Publication Data
US 2013/0191270 A1 Jul. 25, 2013

Related U.S. Application Data

(63) Continuation of application No. 10/263,627, filed on Oct. 3, 2002.
(Continued)

(51) Int. Cl.
G06F 17/30 (2006.01)
G06Q 40/02 (2012.01)
(Continued)

(52) U.S. Cl.
CPC .......... *G06Q 40/025* (2013.01); *G06Q 40/06* (2013.01); *G06Q 40/08* (2013.01)

(58) Field of Classification Search
CPC ........ G06Q 40/06; G06Q 40/02; G06Q 40/04; G06Q 40/025; G06Q 20/322; G06Q 30/00;
(Continued)

(56) References Cited

U.S. PATENT DOCUMENTS 5,550,734 A 8/1996 Tarter et al.
5,794,207 A 8/1998 Walker et al.
(Continued)

FOREIGN PATENT DOCUMENTS

EP 0 999 690 * 5/2000 ............ H04M 15/00
WO 00/11587 A1 3/2000
(Continued)

OTHER PUBLICATIONS

Golinger, Jon, and Edmund Mierzwinski. Mistakes do happen: Credit report errors mean consumers lose. Washington Public Interest Research Group, 1998.*
(Continued)

*Primary Examiner* — Olabode Akintola
(74) *Attorney, Agent, or Firm* — Winston & Strawn LLP

(57) ABSTRACT

A method for implementing a dynamic financial statement may include generating and dynamically updating a financial statement for a consumer based on the receipt of consumer-related information from the consumer or other entities. A database of updated dynamic financial statements may be queried by external systems such as the consumer's or another entity's computer for statements that satisfy one or more criteria. One or more computer systems may create and deliver offers to consumers corresponding to the statements satisfying the query. Those offers may invoke dynamic pricing, e.g., better pricing may be offered to those consumers as compared to consumers that don't satisfy the queried details. Those offers alternatively may invoke collaborative or group pricing, i.e., a certain price may be available if enough consumers accept the offer.

49 Claims, 4 Drawing Sheets

Related U.S. Application Data

(60) Provisional application No. 60/327,156, filed on Oct. 4, 2001.

(51) Int. Cl.
*G06Q 40/06* (2012.01)
*G06Q 40/08* (2012.01)

(58) Field of Classification Search
CPC .......... G06Q 30/0239; G06Q 30/0267; G06Q 30/06; G06Q 40/00; G06Q 30/0601; G06Q 30/0611; G06Q 50/188
USPC .......................................................... 705/35
See application file for complete search history.

(56) References Cited

U.S. PATENT DOCUMENTS

| | | | |
|---|---|---|---|
| 5,842,178 A | 11/1998 | Giovannoli | |
| 5,878,337 A | 3/1999 | Joao et al. | |
| 5,954,793 A | 9/1999 | Stutman et al. | |
| 6,092,102 A | 7/2000 | Wagner | |
| 6,311,169 B2 * | 10/2001 | Duhon | G06Q 20/04 705/38 |
| 6,535,856 B1 * | 3/2003 | Tal | G06Q 30/0601 705/26.1 |
| 6,658,393 B1 | 12/2003 | Basch et al. | |
| 6,725,204 B1 | 4/2004 | Gusley | |
| 6,823,319 B1 * | 11/2004 | Lynch | G06Q 20/10 705/38 |
| 6,886,000 B1 * | 4/2005 | Aggarwal | G06Q 30/02 705/26.3 |
| 6,968,316 B1 * | 11/2005 | Hamilton | 705/36 R |
| 7,024,691 B1 * | 4/2006 | Herzberg | H04L 63/0823 726/27 |
| 7,028,052 B2 | 4/2006 | Chapman et al. | |
| 7,082,569 B2 * | 7/2006 | Voshell | 715/212 |
| 7,200,566 B1 * | 4/2007 | Moore | G06Q 30/06 705/26.3 |
| 7,296,001 B1 * | 11/2007 | Ephrati | G06Q 10/10 705/37 |
| 7,376,603 B1 * | 5/2008 | Mayr | G06Q 30/02 705/35 |
| 7,401,115 B1 | 7/2008 | Arsenault | |
| 7,580,884 B2 | 8/2009 | Cook | |
| 7,877,269 B2 * | 1/2011 | Bauer | G06Q 10/10 705/2 |
| 7,983,979 B2 | 7/2011 | Holland, IV | |
| 8,001,017 B1 | 8/2011 | Franco | |
| 8,108,275 B2 * | 1/2012 | Lubking | G06Q 30/02 705/35 |
| 8,396,455 B2 * | 3/2013 | Carlson | H04L 51/14 455/406 |
| 8,762,237 B2 | 6/2014 | Monasterio et al. | |
| 8,793,147 B2 | 7/2014 | Bradshaw et al. | |
| 9,037,509 B1 * | 5/2015 | Ellis | G06Q 30/0255 705/41 |
| 9,311,654 B1 | 4/2016 | Ellis et al. | |
| 9,607,336 B1 | 3/2017 | Dean et al. | |
| 2002/0004402 A1 * | 1/2002 | Suzuki | G06F 17/30902 455/456.6 |
| 2002/0023051 A1 * | 2/2002 | Kunzle | G06Q 10/10 705/38 |
| 2002/0046299 A1 | 4/2002 | Lefeber et al. | |
| 2002/0049658 A1 * | 4/2002 | Davidson | G06Q 40/04 705/37 |
| 2002/0057678 A1 * | 5/2002 | Jiang | H04L 12/66 370/353 |
| 2002/0091550 A1 * | 7/2002 | White | G06Q 40/08 705/4 |
| 2002/0133462 A1 | 9/2002 | Shteyn | |
| 2002/0194120 A1 * | 12/2002 | Russell | G06Q 10/10 705/38 |
| 2002/0198824 A1 | 12/2002 | Cook | |
| 2003/0055721 A1 * | 3/2003 | Beery, II | G06Q 30/02 705/14.23 |
| 2010/0324980 A1 * | 12/2010 | Schantz | G06Q 30/02 705/14.14 |
| 2013/0080251 A1 * | 3/2013 | Dempski | G06Q 30/01 705/14.53 |

FOREIGN PATENT DOCUMENTS

| | | | | |
|---|---|---|---|---|
| WO | WO 00/67154 | * | 4/2000 | G06F 17/30 |
| WO | WO 00/67154 | * | 11/2000 | G06F 17/30 |

OTHER PUBLICATIONS

Sweeney, "Product Review: Trade Station 4.0 Build 15," Technical Analysis of Stock & Commodities, vol. 14, pp. 649-654, Dec. 1996.*

Sweeney, "Product Review: Trade Station 4.0 Build 15," Technical Analysis of Stocks & Commodities, vol. 14, pp. 649-654, Dec. 1996.

Opening Bell Monthly, AIQ Systems LLC, vol. 8, Issue 10, pp. 1-8, Oct. 1999.

* cited by examiner

METHOD FOR GENERATING DYNAMIC AND COLLABORATIVE PRICING OFFERS IN A FINANCIAL PLATFORM ENVIRONMENT

This application is a continuation application of U.S. patent application Ser. No. 10/263,627, filed Oct. 3, 2002, which claims the benefit of priority from U.S. Provisional Application 60/327,156, filed Oct. 4, 2001, the contents of the latter which are incorporated by reference.

I. TECHNICAL FIELD OF THE INVENTION

The present invention pertains to an electrical digital computer machine and a data processing system, methods of making and for using the machine, products produced thereby, as well as data structures and articles of manufacture pertaining thereto, and all necessary intermediates of that which is disclosed herein, all in the field of computerized aspects of data evaluation for the purposes of risk management, investment and product evaluation, and increased efficiencies in the global economies.

II. BACKGROUND OF THE INVENTION

Financial platforms are defined as databases that contain the most current financial information on the entities. The most basic platform is the credit or risk mitigation platform (hereinafter known as the "credit platform"). The credit platform incorporates all current credit information on an entity into one database. This dynamic database (hereinafter known as the "c-file") instantaneously reflects germane credit information (1) and is available 24/7.

The next platform is the financial statement platform which incorporates the credit platform information with additional financial information (2) on the entity. This additional information creates a dynamic financial statement (hereinafter known as the "f-file"). These platforms and their database offspring create transparencies and provide ample product, service, and management opportunities for our global and interconnected economies (hereinafter known as the "financial web").

Transparency is defined as the accessibility of germane financial and risk information. Significant liquidity and transparency problems have arisen on a global scale that have instilled fear and uncertainty into the minds and markets of the world, and governments and citizens are crying out for better accountability, better governance, and increased transparency.

Businesses understand the dynamic, rapid, and instantaneous nature of the markets and their inherent risks. Not only are they trying to capture and evaluate the most recent data, they are trying to predict behaviors and thus bring new efficiencies into the markets, the businesses, and the lives of the consumer.

Fidelity Investments provides an aggregate financial picture available to its customers. This dynamic snapshot supplies the consumer with current and somewhat comprehensive financial information. A more complete picture with more interactive tools would be an improvement.

The government and the investment community are hard at work to address the lack of transparency in publicly held corporations: better corporate governance, changes in accounting and financial statements, and a general cry for fairness are all at the forefront of today's business climate.

On a global scale, in this interconnected, global economy, liquidity crises and market meltdowns can occur due to lack of transparency.

The Mortgage Industry Standards Maintenance Organization, (MISMO), the new electronic mortgage files sponsored by Fannie Mae and the Mortgage Bankers Association, makes the movement of mortgage files and their parts more efficient. Although not fully implemented across the mortgage industry, the launch of MISMO should supply opportunities of interchangeability within each mortgage package that will create efficiencies that can save investors, businesses, and consumers time and money and decrease risk.

Commercially available 'alert systems' come from the credit bureaus and are geared towards businesses and consumers. Of the three credit bureaus, Trans Union and Experian have such products whereas Equifax does not. At present, two of the credit bureaus have a useful product in place. Trans Union's product is called 'Watch'; Experian's is 'Retention Trigger': each monitors accounts for inquiries. To activate 'Watch', Bank XYZ supplies Trans Union with a name, address (present and previous) and social security number. This account is monitored for inquiries, new tradelines (mortgages, credit cards, installment loans), employment, and address. Should that file receive information about a change in any of the above four categories, a report is mailed out. The cost for this service is $180/year membership fee plus $2/file/month and $4/feedback (20). The feedback is mailed, not emailed or faxed. Experian's product, Retention Trigger, triggers with inquiries or new trade-lines. The feedback is emailed. They limit their customer files to a minimum of 50,000 files. Cost per month is $7,500 plus 2.3 cents per file. 50,000 files would cost $8,650/month. However, all three credit bureaus collect pertinent information and the integration of that information would provide a more complete consumer profile.

For example, in the Illinois counties of Cook and Lake, the environment for 'predatory insurance' exists. Although the term 'predatory' is unusual in connection with homeowners insurance, circumstances in these two counties create an environment whereby a scrupulous business can take advantage of an unsophisticated or enfeebled consumer by stripping equity (22) and/or taking their home. Here is how that scenario plays out:

Because of several severe weather incidents in the past year, a plethora a very expensive claims have been filed in these two counties. As a general rule, the better insurers like Kemper are not renewing policies that have two claims within a three year period. Those homeowners, because all the better insurers are following this practice, find themselves looking for sub-prime insurers. The annual premium on a $300,000 home has gone from around $550 with Kemper-like insurers (hereinafter known as "A-insurers") to $2800 with sub-prime insurers. If the homeowner cannot afford the higher premium and has a mortgage, the mortgage company will buy the policy and that cost can go as high as $7000. They will attach the cost to the mortgage payment; some cannot afford the new payment and default on their mortgage. Although this outcome appears unlikely, the enfeebled and isolated could fall prey to predatory businesses.

In the past, a bank's success in real estate lending was the result of well-documented loan packages undergoing an underwriter's objective scrutiny. However, today's predatory lending environment has lessened the value of the underwriting decision: in the realm of the predatory lender, significant risks begin after the loan leaves the underwriter's hands. Predatory lenders prey upon desperate and/or ill-informed consumers, and it is this reality that the lending world must guard against. A lender that attempts to protect it's portfolio against predatory lenders faces significant challenges:
 1) The resources necessary to battle the predatory lender can be daunting; funding must be available for:
  a) Sufficient and ongoing education of a large client base.
  b) Monitoring a large portfolio.
  c) Damage control and remediation.
 2) The duration of the loans may be for a 30 year term or more. Much can happen during that time span. Sickness, disability, financial hardship, consumerism, etc., all can create an environment ripe for the predatory lender.
 3) Ownership or occupancy may change, affecting the client's stake in the property, its liens, and its value.

Financial products are pricing themselves according to a consumer's risk profile. Mortgages can be less expensive if the credit scores of the consumer are better; certain credit cards price themselves according to risk: the riskier the profile the more expensive is the credit. However, this pricing occurs at acquisition and the consumer's risk profile could improve dramatically shortly thereafter.

III. SUMMARY OF THE INVENTION

In view of the foregoing, an object of the invention is to improve over or overcoming some or all of the drawbacks indicated herein, as observed by the inventor. By way of perspective, this can involve a computer system linked to pertinent data and information to provide more timely and comprehensive information on entity's credit and financial information. The computer system can evaluate the data and information of individual entities and the financial web, and can implement scoring models that help as an evaluation tool. The computer system can share data and information for research purposes, as well as carry out the scoring models with thresholds that incent specific behaviors. The computer system can also create transparencies that help protect against liquidity crises and market meltdowns.

The computer system can be useful for educating consumers and helping them become more financially savvy, as well as in producing more efficient consumer and business products.

More particularly, the present invention can be carried out by providing an improved digital electrical computer-based system configured to address the foregoing objects, including a machine (programmed computer), methods for making and using it, products produced by the method, data structures, and necessary intermediates, collectively referenced herein after as the method (for the sake of brevity). The invention can also be viewed as exemplified as a computer-aided method.

IV. BRIEF DESCRIPTION OF THE DRAWINGS

V. DETAILED DISCUSSION OF THE PREFERRED EMBODIMENT

Figure 1:
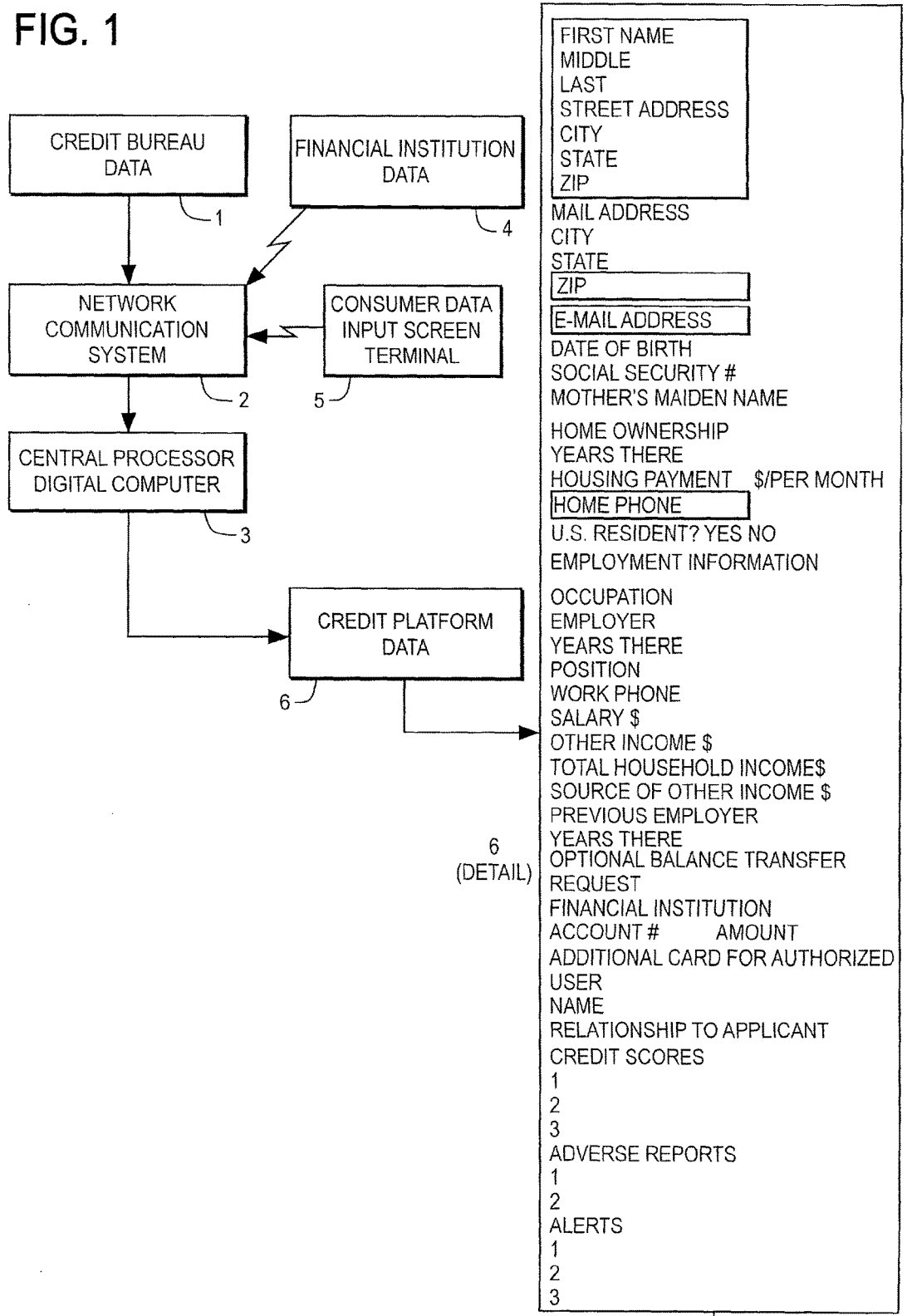
FIG. 1 is a flow chart in accordance with the present invention.

By creating and maintaining financial platforms for individuals, groups, businesses, agencies, and governments (hereinafter known as "entities"), certain capabilities and transparencies arise that carry significant benefits. Benefits range from empowerment of the individual consumer to improved risk and currency management on a global scale.

The financial platforms are databases that contain the most current financial information on the entities. The most basic platform is the credit or risk mitigation platform (hereinafter known as the "credit platform"). The credit platform incorporates all current credit information on an entity into one database. This dynamic database (hereinafter known as the "c-file") instantaneously reflects germane credit information (new tradelines, inquiries, slow pays, liens, etc., and is available 24/7).

The next platform is the financial statement platform which incorporates the credit platform information with additional financial information (assets and liabilities, employment, pertinent histories, etc.) on the entity. This additional information creates a dynamic financial statement (hereinafter known as the "f-file"). These platforms and their database offspring create transparencies and provide ample product, service, and management opportunities for our global and interconnected economies (hereinafter known as the "financial web").

The dynamic, accessible, and transparent nature of the databases provides for an instantaneous incorporation of germane information into not only the database of the immediate entity, but into the financial web as well; as one database changes, so do the other databases that are linked to it (as a consumer leases a car, the new debt changes his/her credit score and risk profile, that change in risk profile effects not only that individual, but all risk pools that he/she participates in, as the lease is reported, the financial web reverberates and incorporates this change). As the economies of the world become increasingly interconnected and transparent, these platforms may enable macro-economists to protect against global economic disasters (we can move money to areas in need: If New York City businesses need shoppers, entities can be incented to spend money electronically; should Mexico need cash, family working in the U.S. can provide extra cash though the system).

Other benefits from increased transparency range from improved customer service and retention to the improved monitoring capabilities of international money-flow; in the wake of the recent terrorist attacks, this information could improve risk management capabilities. A scoring system that rates an entity's financial transparency (see Transparency Score) would prove useful in evaluating risks and could be used alone or woven into other risk evaluation systems. Incentives could motivate transparency (IRS could reduce taxes on those that adhere to specific guidelines for transparency; businesses could participate in improved terms on financial products due to reduced risk, International agreements could increase the transparency of multi-national corporations and countries).

How it Works:

The three credit bureaus (should the integration of Experian, Equifax, and Trans Union become unfeasible, other measures can taken, i.e., beginning with a tri-merged report as a baseline for the c-file, we can rely on only one or two bureaus for subsequent updates; or, we can create an entirely new reporting mechanism that would send information directly to the c-file) continuously update the c-files. Whenever any change occurs, the bureaus instantly send information to the appropriate c-file and the financial web reverberates. There are financial products and platforms that become possible due to the existence of the c-files:

1) The Shield
 a) 'Loan Shield' protects against predatory lending (see Loan Shield);
 b) 'Insurance Shield' protects against 'predatory insuring (See Insurance Shield);
 c) Transparency Score.
2) Financial Statement Platform
3) Research Platform
4) Commerce Platform
 a) Risk Management
 b) Dynamic Pricing
 c) Reverse Bidding
 d) Instant Securities
 e) Lien-free equity loans
 f) Collaborative Pricing Financial Statement Platform The Financial Statement Platform incorporates c-files (credit platform) with additional financial information and results in a current, dynamic 'financial statement database' (hereinafter "f-file") that is available 24/7. Through the creation and continuous updating of individual and group financial profiles, substantial benefits and opportunities arise. Whether a consumer, business, oversight agency, or government, the ability to view a financial profile in it's most complete and current form is empowering. This base of information and knowledge enables an entire web of global and interconnected participants (consumers, banks, insurance companies, Fannie Mae, oversight agencies, governments, etc. herein, hereinafter known as "entities") to interact in a mutually beneficial manner. This transparent and customizable interconnectedness (hereinafter known as "financial web") produces benefits ranging from empowerment of the individual consumer to improved risk and currency management on a global scale.

The dynamic, accessible, and transparent nature of the databases provides for an instantaneous incorporation of germane information into not only the database of the immediate entity, but into the financial web as well; as one database changes, so do the other databases that are linked to it (for example, a consumer leases a car, the new debt changes his/her credit score and risk profile, that change in risk profile affects not only that individual, but all risk pools that he/she participates in, as the lease is reported, the financial web reverberates and incorporates this change). As the economies of the world become increasingly interconnected and interdependent, these customizable platforms may enable the macro-economists to protect against global economic disasters.

How it Works:

An entity's c-file is created by continuously compiling all available credit bureau information into one database that is accessible 24/7. Added continuously to the c-file is pertinent financial information such as assets and liabilities, employment, histories, etc. The c-file morphs into a current and dynamic database that contains more information then would be found in a consumer mortgage application. The new f-file provides financial metrics, offers, and advice. These files also exist for groups, businesses, agencies, and governments.

Benefits:

At the consumer level, access to one's personal f-file provides an instantaneous financial snapshot that informs the consumer as to how the financial web views and values him/her. This level of transparency permits customizable consumer interaction with the financial web. Each foray into their personal f-file can produce cash and/or savings. The consumer can:

1) review the information and efficiently correct inaccuracies;
2) review and improve their credit scores (improvement in credit score improves the risk profile and can be immediately reflected not only throughout the financial web but also in loan and insurance terms, see 'Dynamic Pricing', the consumer can query their 'e-consultant' or the e-consultant can advise on how to improve their f-file);
3) review and improve profitability scores;
4) get paid to participate in the following (currently, banks offer consumers financial incentives to use products that save it money, consumers can interact with their 'Profitability Score', and begin to understand how to be a better customer and get paid for it, financial institutions can use this to up-sell more profitable products: just as many believe consumers need to understand their credit score, so too their profitability score) new behaviors beneficial to the financial web:
 a) debit, credit, and ATM cards;
 b) electronic bill pay/presentment;
 c) home equity loans;
 d) portable communication devices (time-critical offers and important profile changes send alerts to the consumer's cell phone or other portable device, college students in particular are interested in wireless technology).
 e) direct deposit;
 f) account aggregation;
5) receive bids for loans and other products (see 'Commerce Platform');
6) peer-to-peer pooling (collaboration) of loans and other products (see 'Commerce Platform');
7) receive advice on how to improve their financial picture (a consumer's understanding of how he/she fits into the financial web facilitates his/her evolution into a more financially savvy consumer, this service/database provides for step-by-step education of consumers wishing to participate in the American Dream; non-profits and faith-based groups can be utilized to set up the financial platforms and provide consultation);
8) receive important alerts (asset depreciation, rising taxes and bills, market changes, etc.)

At the business level, the benefits of increased transparency abound:
1) improved risk management;
2) Real-time enterprise communications (RTEC)
3) demand management Commerce Platform At the consumer level, the financial platforms permit another platform: the commerce platform. The commerce platform utilizes the financial platforms to market and create new markets:
1) Dynamic Pricing;
2) Bidding;
 a) instant securities;
 b) instant loan acquisitions;
3) Peer-to-peer
 a) group pricing;
 b) instant securities;

Also, parts of mortgages can be bid on:
1) homeowners insurance;
2) title insurance;

An insurer, utilizing credit platform's early warning capability, can bid on the title insurance for a purchase or refinance; also, savings to the consumer results from the ease of issuing the policy due to the electronic nature of the transaction.

$hield $hield is a visual symbol signifying an entity's adherence to guidelines for standards and practices, policies, and procedures in financial matters. $hield can also warn and announce: this entity is registered and protected $hield; or this entity does not participate in predatory practices and/or has an acceptable level of transparency.

Loan $hield

Loan Shield (LS) protects lenders and consumers from predatory lenders. As a front-line defense, LS is an early-warning alert system that helps lenders more efficiently manage risk and consumers more effectively protect their equity.

In the past, a bank's success in real estate lending was the result of well-documented loan packages undergoing an underwriter's objective scrutiny. However, today's predatory lending environment has lessened the value of the underwriting decision: in the realm of the predatory lender, significant risks begin after the loan leaves the underwriter's hands. Predatory lenders prey upon desperate and/or ill-informed consumers, and it is this reality that the lending world must guard against. A lender that attempts to protect it's portfolio against predatory lenders faces significant challenges:

1) The resources necessary to battle the predatory lender can be daunting; funding must be available for:
   a) Sufficient and ongoing education of a large client base.
   b) Monitoring a large portfolio.
   c) Damage control and remediation.

2) The duration of the loans may be for a 30 year term or more. Much can happen during that time span. Sickness, disability, financial hardship, consumerism, etc., all can create an environment ripe for the predatory lender.

3) Ownership or occupancy may change, affecting the client's stake in the property, it's liens, and it's value.

Here is what LS is: Loan Shield is, in theory, a comprehensive compilation of agencies that, because of their involvement in a real estate transaction, are available to send lenders timely reports critical to risk underwriting and monitoring. Upon purchasing or renting a home, refinancing or applying for a new loan, different companies, agencies, organizations, and individuals (collectively 'agencies') may be contacted to perform services necessary to complete the transaction. Each agency becomes a contact or trigger point available to alert Bank XYZ of an impending change. As Bank XYZ receives these alerts, an employee of the bank needs to critique each one and decide on the appropriate action.

Agencies: Credit bureaus, insurance companies, employers, Realtors, banks, appraisers, surveyors, mortgage companies, buyers, condo associations, utilities, postal service, and even the IRS may get involved in the generation of a new loan or the purchase/rental of a home. The contact with a specific agency may occur early or late within the generation period (origination through close) with the hope being to get as early an alert as possible.

Some of these agencies already have commercially available products that would fulfill LS's goals; other agencies would need to have the appropriate program set up.

Commercially available products come from the credit bureaus. Of the three credit bureaus, Trans Union and Experian have such products (see Appendix A) whereas Equifax does not. In order for LS to operate with maximum effectiveness, all three bureaus must participate in LS. Since Equifax does not have this product, it is necessary for them to either launch it commercially or provide LS with a similar service. It may be possible to engage one of the bureaus to coordinate all three, creating a new product. The task here is to coordinate the three bureaus and do so in a cost-effective manner.

Sole reliance on the credit bureaus for LS's effectiveness may not be the best approach, however, since not all predatory lenders pull a credit report. Because a credit report may not get pulled, other agencies besides the credit bureaus can provide additional, more comprehensive protection. With each transaction:

1) property insurance companies are contacted to either add or change a lender;

2) title insurance is renewed or generated;

3) banks and employers supply verifications of deposits and employment;

4) appraisers and surveyors render service;

5) condo associations supply 'declarations and documents' to lenders and review accounts for assessments; 'move-in, move-out' fees may alert them to a new rental situation;

6) utilities initiate or cancel services;

The vision for LS is to engage as many of these potential contact points as possible, engaging them to alert Bank XYZ when a transaction is occurring (see Appendix B). Should a predatory lender be involved, Bank XYZ may have a chance to remedy a situation before it becomes a difficult problem.

Predatory lending preys upon desperate and/or ill-informed consumers who borrow money at terms detrimental to either the consumer or a lien holder, or both. Constant, consistent, and comprehensive electronic and 'information flow' monitoring is a formidable weapon in this battle.

LS provides protection to many parties: Bank XYZ, the consumer, condo owners, insurance companies, etc. In essence, LS protects homeownership and the real estate industry with one exception, the predatory lending business.

APPENDIX A

Below is an general example of how LS functions using the credit bureaus':

At loan origination, a client signs a disclosure (in the trade, the disclosure is referred to as 'Permissible Purpose under Account Review') permitting Bank XYZ to use LS. When activated, LS's electronic shield monitors the loan 24/7. While LS is active, if the client engages a new lender, that new lender will pull a credit report. It is that action that triggers LS's alert response.

When the credit report is pulled, the credit bureau sends a report to the appropriate party that an inquiry has been made at the credit bureau level. In the case of Bank XYZ, this alert signals someone at the bank and initiates an investigation. A simple phone call or two may alleviate a potentially damaging situation.

LS wants all three credit bureaus, Trans Union, Equifax, and Experian, to participate. At present, two of the credit bureaus have a useful product in place. Trans Union's product is called 'Watch'; Experian's is 'Retention Trigger': each monitors accounts for inquiries. To activate 'Watch', Bank XYZ supplies Trans Union with a name, address (present and previous) and social security number. This account is monitored for inquiries, new trade-lines (mortgages, credit cards, installment loans), employment, and address. Should that file receive information about a change in any of the above four categories, a report is mailed out. The cost for this service is $180/year membership fee plus $2/file/month and $4/feedback (it may be possible to get this at a lower cost, each bureau may require setting up different accounts for each state, and that account has different pricing structures, I don't know if a new membership fee is required in each state, it would be useful to see if the credit bureaus would like to link together to form this business). The feedback is mailed, not emailed or faxed.

Experian's product, Retention Trigger, triggers with inquiries or new trade-lines. The feedback is emailed. They limit their customer files to a minimum of 50,000 files. Cost per month is $7,500 plus 2.3 cents per file. 50,000 files would cost $8,650/month.

APPENDIX B

LS, as described, can benefit the agencies in many different ways; some specifics are listed below. As well, with some changes, LS could provide additional, more general benefits. For instance, if LS didn't just receive alerts, but also shared alerts with multiple agencies, these agencies could be warned of potential problems and/or introduced to a cross-selling opportunity.

Credit bureaus are selling this product.

Insurance companies are in the risk business as is Bank XYZ. They not only insure property and title, they insure loan portfolios and rate mortgage-backed securities (possible name change from Loan Shield to 'Portfolio Shield'). When loan risks change, insurance companies want to know as well. Therefore, LS benefits insurance companies from a risk (economic) perspective. We may also want to share LS's alerts, thus allowing them to cross-sell their products and/or reassess risk.

Condo Associations need to be mindful of their budget, and when an owner suffers financial hardship, assessments may not get paid. This can effect the entire condo association, leading to higher assessments and declining property values. With LS in place, a potentially harmful predatory loan may be avoided.

Banks can share information in a mutually beneficial manner.

Employers sometimes assist with employee home purchases, and a system that keeps them out of financial problems is useful.

Mortgage companies could be required by regulators to participate along with the appraisers and surveyors that rely on the mortgage companies for business.

Insurance Shield (IS)

'Predatory' Insurance

Today, in the Illinois counties of Cook and Lake, the environment for 'predatory insurance' exists. Although the term 'predatory' is unusual in connection with homeowners insurance, circumstances in these two counties create an environment whereby a scrupulous business can take advantage of an unsophisticated or enfeebled consumer by stripping equity (the practice of taking large, unreasonable amounts of money for fees and services, in the case where a lender buys the expensive insurance, the cost for the insurance may only be recoverable through foreclosure) and/or taking their home. Here is how that scenario plays out:

Because of several severe weather incidents in the past year, a plethora a very expensive claims have been filed in these two counties. As a general rule, the better insurers like Kemper are not renewing policies that have two claims within a three year period. Those homeowners, because all the better insurers are following this practice, find themselves looking for sub-prime insurers. The annual premium on a $300,000 home has gone from around $550 with Kemper-like insurers (hereinafter known as "A-insurers") to $2800 with sub-prime insurers. If the homeowner cannot afford the higher premium and has a mortgage, the mortgage company will buy the policy and that cost can go as high as $7000. They will attach the cost to the mortgage payment; some cannot afford the new payment and default on their mortgage. Although this outcome appears unlikely, the enfeebled and isolated could fall prey to predatory businesses.

Insurance $hield works to prevent this problem; 1$ is, in theory, a comprehensive compilation of agencies that, because of their involvement in an insurance event such as claims, the underwriting of new policies, or non-renewals, are available to send the appropriate parties timely reports critical to risk underwriting and monitoring. It provides an early warning to lenders and associated parties that a homeowner's policy is skyrocketing or not being renewed. Here is how it works:

Specific information is compiled and/or gathered when these events occur:

1) a claim is filed;
2) new insurance is sought;
3) a policy renewal is denied.

These events can trigger an alert that will inform an associated party(s) that a potentially harmful situation exists, allowing for intervention and/or remediation.

When a claim is filed a report is sent to:

Comprehensive Loss Underwriting Exchange (CLUE), the insurance companies shared database for claims, can alert the appropriate parties whenever a homeowner has two claims within a three year period. Presently, insurance companies have certain notification requirements set by each state; in Illinois, the homeowner and lender must be informed of an impending non-renewal sixty days before the anniversary date. Agents may be informed ninety days in advance.

As a general rule: the more time everyone has to respond to the non-renewal (hereinafter known as the "response time"), the better. By increasing the response time, the chances of finding a reasonable alternative increase.

Two other triggers that can generate alerts: new policies and renewal rejections. In each case, databases of information are accessed, and each inquiry into those databases can alert appropriated parties that a problem may exist. When a new policy is underwritten, a database of credit information is accessed and could electronically send an alert; CLUE would also be accessed, and CLUE could also send alerts; when a renewal is underwritten, these databases are accessed again.

There are product possibilities:

1) insurance enhancement that allows the consumer to continue to remain with a Kemper-like insurer.

2) mid-range homeowners insurance that bridges the A and sub-prime insurance.

3) certification of insurers with Insurance Shield will require a more timely notification of non-renewal along with remediation possibilities.

4) warning system to those with one claim and are in danger of filing another:
  a) a recent weather event is generating a lot of claims.
  b) a recent downturn in the consumer's finances.

It could be required by the states that the homeowner and lender be immediately informed upon achieving thresholds necessary for rejection; or, insurance companies can follow the guidelines for Shield certification and voluntarily inform their clients.

Transparency Score

As the participants in the financial web become more transparent, they become less risky. A scoring process that rates an entity's transparency will prove beneficial in evaluating risks.

Lien-Free Equity Lending

By utilizing c-files (it is not necessary to use c-files; however, it would be useful for risk mitigation and Customer Relationship Management (CRM), insurance companies can mitigate risks and provide new financial products to their clientele. One opportunity lies in the creation of a new line of products that utilizes mortgage escrow accounts as vehicles for tapping equity without placing a new lien on the property (hereinafter known as "i-loan").

By targeting mortgagees that either have escrows or would be willing to set up escrows (tax, insurance, etc.), insurance companies can facilitate mortgagees tapping equity in their homes. The insurance company can:

1) insure the risk (provide enhancements that allow lenders to provide cost effective credit lines (possibly via a credit card). Enhancement risk is mitigated with c-file);

2) lend on the equity (use a credit card to set up a line-of-credit and insure the risk. Pricing would be better than a credit card and have built into it the cost of setting up c-file and/or insuring the risk).

How it Works:

Homeowners Insurance

The homeowners insurance policy provides for an optional credit line or i-loan accessible through a credit card. The i-loan is loosely tied to the equity in their home (several scenarios are possible: Uniform Commercial Code which would place a lien on the property but with much less paperwork; Lies-Pendens would place a cloud on the title; a pledge of the equity; or by simply having the i-loan payment flow through the monthly mortgage escrow payment). As an example, a client has a home worth $100,000 and a mortgage of only $50,000; 80% of the equity minus the first mortgage balance is available.

The pricing of the line is less than credit card rates but higher than home equity rates. The spread is what the insurance company makes.

Payments on the i-loan flow through the monthly mortgage payments. Should an instance arise whereby the mortgage payment becomes threatened due to a spike in insurance costs, taxes, and/or interest rate, the mortgage balloons, illness, etc., the i-loan may either wholly or in part be separated from the first mortgage and function alone.

The client agrees to several stipulations:

1) the creation of their c-file;

2) no additional liens or pledges on the home;

3) mortgage escrows;

4) ability by the insurance company to lien the property should problems arise.

Benefits:

The Consumer:

1) efficient, cost-effective access of equity;

2) no new liens;

3) protection against predatory insurance;

Insurance Company:

1) income stream;

2) CRM;

3) risk mitigation;

4) new, cutting-edge product with Fannie Mae;

5) relationship with issuer and/or lender;

Fannie Mae:

1) meet customers' needs;

2) brand-building.

Lien-Free II

By following a similar mortgage escrow strategy, another loan product would flow through the real estate tax escrow. Again, an insurance policy would mitigate the lending risks as would c-file.

In this case, a city organization, possibly an approved Fannie Mae seller-servicer would offer a credit card that could tap the equity without creating a lien. This city card would help the organization build awareness and community spirit, create an income stream for the organization, protect against predatory practices.

Another tactic is to work through taxing bodies to provide financing and/or tax relief: the homeowner's property taxes are paid by the lender and the loan is paid off when the house is sold. An agreement between the lender and the taxing body keeps the tax lien position in place until the loan is paid off.

Research Platform

The data generated by the financial platforms can be utilized in a variety of ways for research purposes. As predictive modeling techniques and computing power increases, germane raw data aids in creating powerful forecasts that benefit all aspects of life. This data, combined with health data, can help predict the effects of finances on health and allow forecasters to mobilize resources for improved response. In a deteriorating economy, it may be noted that there is increased use of psychotropic drugs such as Prozac, and that the largest increases in use come from people who live on the coasts and within specific income ranges. Resources can be allocated thusly.

This raw data and its uses can be patented. A study of the joining of different databases of information for predictive and other purposes (Patent Factory) can be undertaken to determine where the patenting potentialities exist and which appear most valuable.

Dynamic Pricing

Dynamic Pricing is made possible through the creation either the c or f-file or both. Whereas both the c and f-file instantaneously reflect changes, dynamic pricing is a function of those changes.

For example, as a consumer improves his/her credit score from 650 to 675, that consumer, based on credit score, is less of a risk and the terms and pricing of various financial instruments instantaneously reflect this improvement with an improvement in pricing/terms.

Even today, credit card issuers discern between higher and lower credit scores in their pricing, giving better credit scores a lower interest rate. Dynamic Pricing allows for the consumer to pursue better rates/terms on a 24/7 basis.

This type of instrument performs a continuous underwriting of the consumer file, therefore we have Dynamic Underwriting. Real estate developers and investors have expressed interest in knowing on a constant basis how much money is available to them and at what rate/terms. Construction/Development lending and risk management in this area would improve greatly from the increased transparency/utility.

The credit bureaus may be very interested in this because of its constant utility.

All changes in pricing/terms are instantaneously reflected throughout the financial web.

Reverse Bidding

Financial products can be bid on and produced on a 24/7 basis. Lenders can query the master database for consumer profiles in order to send out offers at improved rates/terms for the consumer. Should a lender wish to fill a pool of loans quickly, that lender may be willing to sacrifice rate for speed and offer terms better than what the consumer has or could get in the general marketplace. The consumer is sent an alert to his/her portable phone and given the opportunity to be one of twenty one consumers to take advantage of this offer (like a big 'jump-all').

With the advent of MISMO, the new electronic mortgage files sponsored by Fannie Mae and the Mortgage Bankers Association, the interchangeability of individual mortgages and the individual 'parts' of mortgages creates efficiencies and opportunities (redundancies in simple refinances may disappear. As an example, title insurance can transfer from one mortgage to the next without the expense of generating a new policy or renewal fee. An insurance company in control of this system can maximize pricing and acquisition rates of title policies). A lender can send offers to specific f-files and alerts can be transmitted to the specific consumers. Should this lender need fifty loans to fill a pool, that lender may be willing to sacrifice rate to move the pool. The time-critical nature allows consumers, via their cell phones, to accept or reject the offer. An acceptance instantly transfers the loan to the pool. Another lender may wish to create a pool, sending thousands of offers to the appropriate f-files, and effectively create an instant security.

This same method can be used to back-fill credit card securities that are always experiencing high turn over.

Instant Securities

Financial products can be produced using the above scenario, only in this instance the consumer is asked whether he/she wants these loan terms, and by agreeing the consumer now becomes part of a pool that is being generated through this methodology. Instant securities can be generated via collaboration methods.

Demand Management

Consumer and business demands can be better predicted with this 'closer-to-home' methodology. By creating algorithms and other prediction methodologies via financial platform use, this improved forecasting of demand helps businesses with inventory control and pricing; demand forecasting can also help manage risk. The wealth and use of information available due to the existence and use of financial platforms is incalculable.

In order to avoid the meltdown that happened to Cisco Systems, financial platforms could prove useful. Information experts envision increased transparency in the supply-chain of companies, and as they employ RTEC, real-time enterprise computing that links sales, marketing, manufacturing, inventory, human resources (HR), accounting, and financials, everything in the chain is polled continuously and available immediately. Cisco Systems and its investors would have benefited from RTEC by having known in advance that mountains of orders for their product had evaporated; they found out too late and their stock collapsed. Financial platforms combined with demand management can front-end load that system with customer information and improve the RTEC system with better forecasting.

Lenders and insurers can use 'dynamic pricing' in conjunction with Demand Management tools to lend to businesses as those businesses purchase goods. Demand Management can be used by the financial web to predict demand and adjust for risk.

Collaborative Pricing

Businesses collaborating for purchase or development purposes can receive bids from insurance and banking concerns that involves a part or the entire chain of participants. Demand management tools can affect the pricing as can the c or f-files and transparency scores.

FIG. 1 shows, in block diagram form, the computer-based elements, which can be utilized to implement the present invention. FIG. 1 provides the foundation for the invention. There are several components to the invention, in the present embodiment, though it is to be understood that this is an illustrative teaching, with all elements, steps, and features being replaceable, substitutable, and interchangeable within the spirit of the invention that transcends a particular embodiment.

Accordingly, Credit bureau data (1) represents third party data sent via Electronic File Transfer (EFT) and a Transmission control protocol/Internet protocol (TCP/IP) network communications system (2). Credit bureau information from Equifax, Experian, and others.

With regard to Network Communications Systems (2), any upstream, internet Service Provider (ISP) utilizing TCP/IP to transmit data between Data Input Screens. Examples of ISPs include uunet, starnetusa, and Exodus. Well-known and accepted protocols may be any transmission standard able to conduct digital information, including optical, FireWire, fiber optic, infrared, cellular, wireless, hard wire, small computer system interface (SCSI), ethernet, trunk lines, satellite, and other like systems, may be employed.

Central Processor and Digital Computer (3) (or via distributed computing) represents the electrical computing devices that receive, process, store, analyze, and distribute data. It is to be expected that numerous computing devices will be employed as business volume grows. The Central Processor and Digital Computer (3) can be comprised of these components:

- one or more CPUs (Central Processing Units);
- one or more digital computers commonly referred to as "servers" ("servers" are the gateway between Local Area and Wide Area digital computers);
- Data storage (hard drives)
- Routers;
- Applications, such as web browsers, word processors, database engines, etc.

Financial Institution Data represents third party data sent via Electronic File Transfer (EFT) and a TCP/IP network communications system (2). Data from banks such as Bank One and many others.

Further there is Data Input Screen and Terminal (5). Using a network-enabled computer, such as a PowerPC604e and Apple Cinema display, the consumer links to the invention network site by telephone, or telephone-adaptive device, such as TDD. Using his or her touch-tone phone or TDD, the customer interacts with Customer Service Center.

Credit platform data (6) illustrates the central storage system for all individual consumer credit data.

Health data (8) represents the central storage system for all individual consumer health data.

Centralized databases exist for access by insurance companies for underwriting purposes. For example, Insurance Data (9) represents the central storage system for all individual consumer insurance data like CLUE.

Mortgage Data (10) represents the central storage system for all consumer mortgages. Fannie Mae, Freddie Mac, and title insurance companies have that information.

Financial Platform Data (14) illustrates the central storage system for individual consumers' financial data.

Business Product Data (17) represents the business products and services being offered to the consumers such as account aggregation, cell phones, insurance products, etc.

Subscriber database (18) represents the central storage system of all individual financial platform data.

Turning now to FIG. 1, note that Credit bureau data (1) is sent through the Network Communications System (2) to the Central Processor Digital Computer (3) along with information from financial institution databases (4) and input from the consumer (5). The computer analyzes and compiles the credit platform data and displays it (6).

Figure 2:
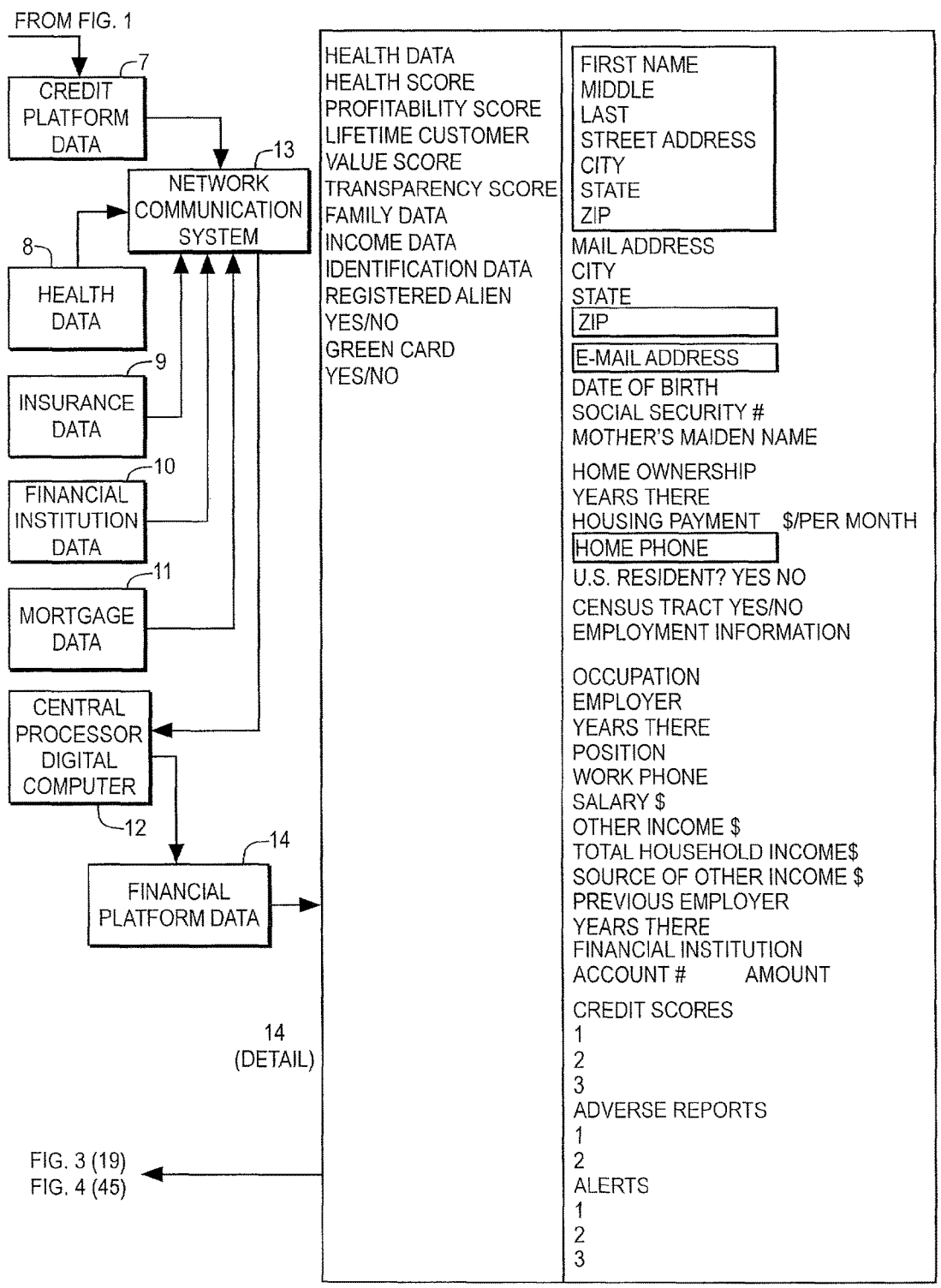
FIG. 2 is a flow chart in accordance with the present invention.

Now in FIG. 2, Credit platform data (7) is sent to the Network Communications System (13) along with Health data (8), insurance data (9), financial institution data (10), and mortgage data (11). This data is received, analyzed, and processed by the Central Processor Digital Computer (12) and displayed as Financial Platform Data (14).

Figure 3:
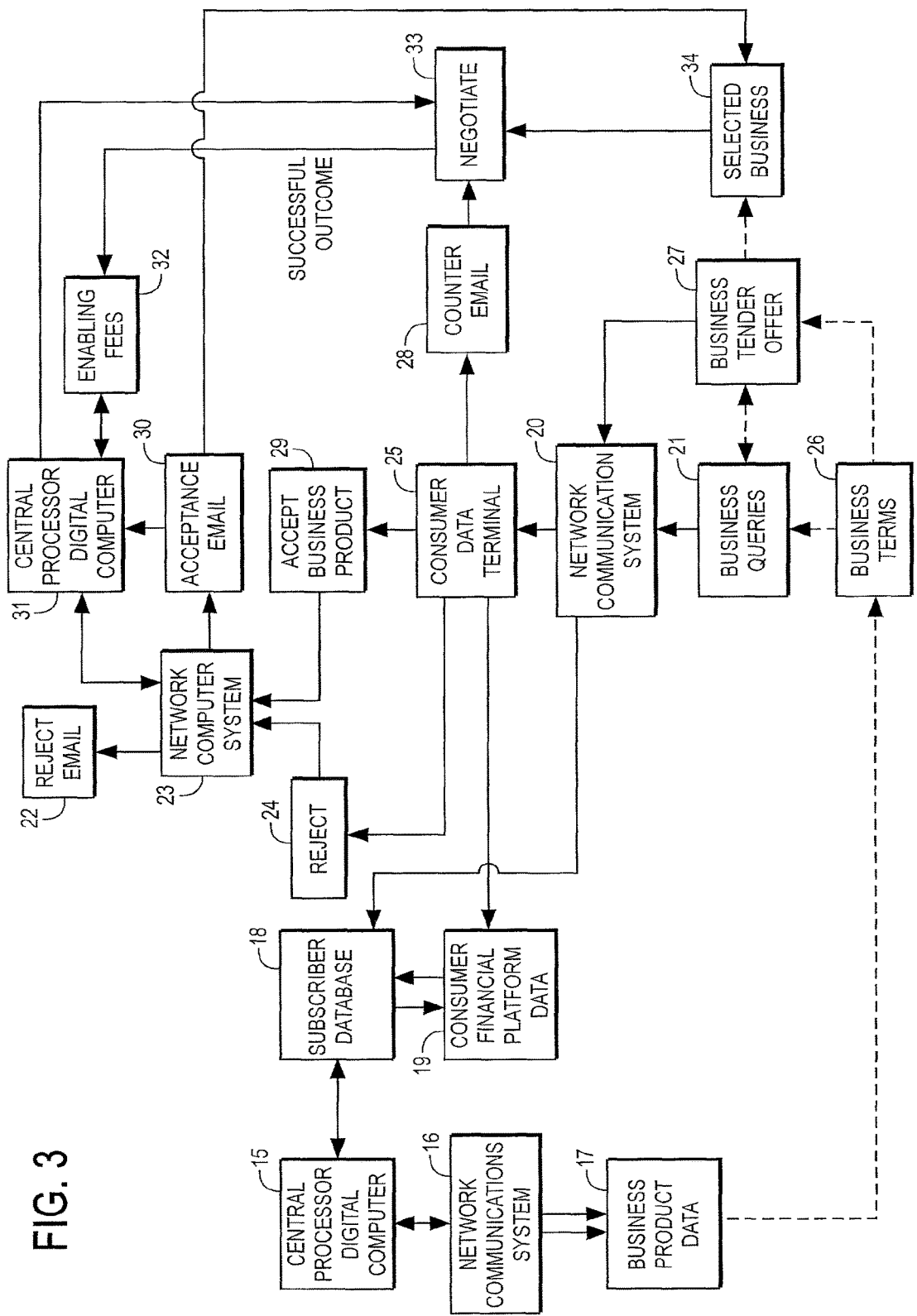
FIG. 3 is a flow chart in accordance with the present invention.

Referring to FIG. 3, Businesses tender offers (27) after making queries (21) through the Network Communications System (20) to Subscriber Database (18) which sends pertinent data through the Central Processor Digital Computer (15), that sorts the queries into individual offers. These are sent through the Network (16) as business product data (17) that is specified into business terms (26) to create individual offers (27). The consumer (25) may reject (24), accept (29), or counter (28) the offer. The rejection and acceptance travel through the Network (23), and either a reject email (22) or an acceptance email (30) is sent. An acceptance email travels to both the selected business (34) and the Central Processor (31), the latter charging any enabling fees (32). If the offer is countered (28), the selected businesses (34) may negotiate (33). A successful negotiation results in enabling fees being charged (32).

Figure 4:
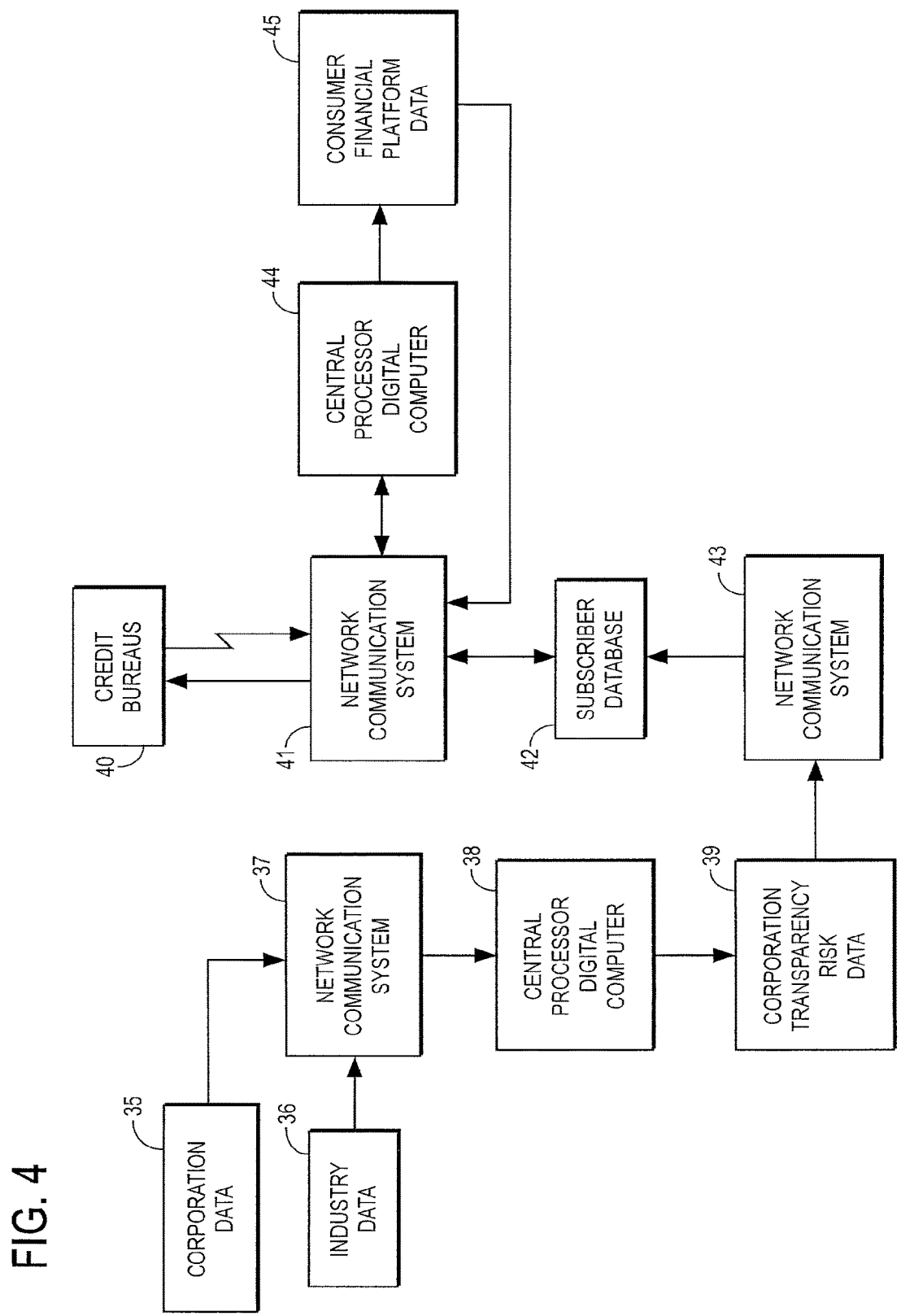
FIG. 4 is a flow chart in accordance with the present invention.

As illustrated in FIG. 4, Corporation (35) and Industry (36) Data are sent through Network (37) to Central Processor (38) where it is compiled, analyzed, and evaluated and creates Corporation Transparency Risk Data (39). This data is sent through the network (43) to the subscriber database (42) of consumer financial platforms, which sends, through the network (41), this combined data to the credit bureaus (40) and Central Processor (44). The Central Processor compiles, analyzes, evaluates, and scores the data and sends this to the Consumer Financial Platform Data (45). The credit bureaus recompute the credit scores and send to the Central Processor (44) via the network (41).

The updated consumer platform data is sent to the subscriber database. By carrying out the foregoing, there is illustrated an apparatus and method for managing finances and risks with a computer. The computer carries out the method, which can include the steps of: collecting credit, job, health, family, and financial information at the computer; evaluating this information with the computer; scoring this information with the computer; and generating output including information on financial and risk management.

While this invention has been particularly shown and described with reference to a preferred embodiment, it will be readily appreciated by those of ordinary skill in the art that various changes and modifications may be made without departing from the spirit or scope of the invention. It is, therefore, contemplated that the appended claim(s) be interpreted as including the foregoing and other changes and modifications.

What is claimed is:

1. A method of promptly notifying an entity of monitored information in a peer-to-peer computer network wherein a plurality of computer systems are configured to be interconnected and communicate over the network, with at least some of the computer systems corresponding to different organizational entities, the method comprising:

receiving by a second entity a communication responsive to updated monitored financial information of one or more entities from a first computer system of a first entity;

triggering by the second computer system a selection of a third entity based at least in part on the communication;

generating, by the second computer system, notification information responsive to the communication;

determining by the second entity that the notification information is time critical and should be promptly forwarded to the third entity;

when the notification information is determined to be time critical, promptly forwarding an alert of the notification information to a cell phone of the selected third entity, wherein the notification information is viewable in its most complete and current form on the cell phone of the selected third entity, with the cell phone including a method for in-system response through the network by the selected third entity;

providing an early warning system when the second computer system and cell phone are interconnected that informs the third entity that the second entity has transparency in that it does not participate in predatory practices or is registered as having an acceptable level of transparency, while providing a visual symbol as a certification of such transparency to also provide the third entity with improved monitoring and risk management capabilities so that the third entity may safely communicate or respond to the alert; and receiving, at a computer of the second or another entity other than the first or second entity, a response to the notification information from an in-system response through the network by the selected third entity.

2. The method of claim 1, whereas the monitored information is an entity profile or a consumer profile.

3. The method of claim 1, wherein the alert is responsive to an algorithm.

4. The method of claim 1, wherein the monitored information relates to a consumer and which further comprises the consumer signing a disclosure to provide permission.

5. The method of claim 1, whereas the monitored information contains an update from an online consumer or from an online business query.

6. The method of claim 1, whereas the monitored information contains an update involving a transaction or potential transaction.

7. The method of claim 1, wherein the alert is forwarded to the computer systems of at least one other entity.

8. The method of claim 1, where the alert relates to cross-selling of products, offers from businesses, lenders, or insurers, credit or profitability scores, financial metrics, advice, bids or inaccuracies.

9. The method of claim 1, wherein the alert is a function of specific f-files, specific consumers, specific income ranges, health data, or where they live.

10. The method of claim 1, wherein the alert contains information responsive to individual or group financial profiles, financial risk profiles or financial reports; or to consumer, business, oversight agency, or government financial profile, or risk profiles.

11. The method of claim 1, wherein the alert contains information responsive to market changes, a change in an asset, a bill, a change in a credit score, or initiating a new account.

12. The method of claim 1, wherein the alert contains information responsive to an offer, and the entity sending the alert queries profiles of the first entity prior to sending the alert and offer to the first entity.

13. The method of claim 1, wherein the alert contains information responsive to a credit inquiry.

14. The method of claim 1, which further comprises the first computer system receiving information from the selected third entity to efficiently correct inaccuracies, improve credit scores, improve profitability scores, initiate a new account, get recompense for participating in new behaviors, opening accounts or getting products, investigate a bill, request a bid, get advice, query an e-consultant, get advice from an e-consultant, a peer-to-peer pooling opportunity, or provide information about offers, profiles, assets, taxes, bills, or market changes.

15. The method of claim 1, wherein the alert contains information responsive to a forecast derived from research, to predictive modeling techniques, or to a forecast derived in part from raw data.

16. The method of claim 1, wherein the alert contains information responsive to corporation data, industry data, transparency data, risk data, business product data, consumer financial platform data, credit platform data, health data, insurance data, financial institution data, mortgage data, financial platform data, health score, profitability score, lifetime customer value score, transparency score, family data, income data, citizenship data, address, date of birth, social security number, mother's maiden name, email address, homeownership data, housing data, employment data, income data, credit scores, adverse reports, or consumer data.

17. The method of claim 1, wherein the in system response to the notification information from the selected third entity is also received by the computer of at least one or more other entities through a communications link.

18. The method of claim 17, wherein the alert or the response to the alert or update is shared with one or more additional entities.

19. The method of claim 18, wherein the response is required by regulators to be shared with other entities.

20. The method of claim 1, wherein the alert, response(s), updates, or information is communicated through a web of interconnections or links between computers that have acceptable transparency, risk, or accessibility.

21. The method of claim 20, wherein the interconnections or links join different computers to form a financial web that transmits information.

22. The method of claim 21, wherein the computers are connected with customizable interconnections that provide improved and verified access to germane information, improved computing power, or improved resource allocation.

23. The method of claim 1, wherein an alert, response, or update includes a consumer query of a robo-advisor or comments from a robo-advisor.

24. The method of claim 21, wherein the web connects computers in a real time enterprise computing system or supply chain platform that links entities, businesses, or consumers with demand management.

25. The method of claim 21, wherein the web connects peer-to peer computers collaborating by pooling offers and transactions in order to create efficiencies and by agreeing to pre-set terms that instantaneously create a transaction.

26. The method of claim 25, wherein a transaction is triggered electronically based on previously agreed upon terms.

27. The method of claim 21, wherein the computers are interconnected for collaboration or distributed computing purposes that improve protection, transparency, empowerment, interconnections, communications, transactions, monitoring, risk management, finances, commerce, or research.

28. The method of claim 21, wherein permission is necessary for access into a web with collaborative or distributed computing or into a web with a shared database.

29. The method of claim 21, wherein the web connects computers that send, receive, and update time-critical offers, profile or event changes, weather, job, family, credit, health, or financial information and forwards this information to a wireless device, cell phone, computer, or other portable device.

30. The method of claim 1, wherein subsequent communications of the computers are interconnected through a customizable and verifiable connection that improves access.

31. The method of claim 21, wherein the web connects computers that enable a shared, dynamic, protected against predators, transparent and accessible transaction database containing a chain of successfully evaluated transactions that subsequently and sequentially update the database.

32. The method of claim 31, wherein the update is shared with other computers.

33. The method of claim 31, wherein an entity gets paid for beneficial behavior after having participated in a "jumpball" opportunity that resulted in a transaction which updates the database.

34. The method of claim 19, wherein the interconnection involves a disclosure or permission to use, monitor, or share information.

35. The method of claim 34, wherein the disclosure or permission can be viewed in its most complete and current form.

36. The method of claim 19, wherein the information that is communicated includes electronic money transfers, money monitoring or money-flow or other forms of economic or terrorism protection.

37. The method of claim 1, wherein the monitored information contains an update of information involved in a disclosure or permission to use, monitor, or share.

38. The method of claim 1, wherein the alert, the response to the alert, or the update to either involves a disclosure or a permission to monitor, use, or share.

39. The method of claim 1, wherein the web is subject to requirements by regulators that includes disclosures, permissions, sharing of information, predatory protections, data processing, storing, transfer, reporting, analysis, and distribution.

40. The method of claim 1, wherein a response to the notification information is also received at a computer of the first entity.

41. The method of claim 1, wherein the second entity queries the master database for consumer profiles.

42. The method of claim 41, wherein the second entity sends a notification, update, response, information, or offer that includes a list of entities or links to other entities.

43. The method of claim 42 wherein the list is a scored list subjected to evaluations of interconnections.

44. The method of claim 1, wherein scores and metrics are generated and used including transparency, data, risk, credit, and profitability scores.

45. The method of claim 1, wherein health notes, health data, and information are received, stored, processed, or analyzed using algorithms and displayed, transferred, or shared in order to cut costs, improve the health response, transmit data, improve resource allocation, or research.

46. The method of claim 45, which involves a disclosure, or involves permission to use, monitor, or share, or involves requirements by regulators.

47. The method of claim 13 wherein the response to the notification information from the selected third entity is received by the computers of more than one other entity.

48. An apparatus for promptly notifying an entity of monitored information in a peer-to-peer computer network that includes a plurality of computer systems configured to communicate over the network, with at least some of the computer systems corresponding to different organizational entities, the apparatus comprising:

a second computer system that:
  receives a communication responsive to updated monitored financial information of one or more entities from a first computer system of a first entity;
  triggers a selection of a third entity based at least in part on the communication;
  generates notification information responsive to the communication;
  determines that the notification information is time critical and should be promptly forwarded to the third entity;
  when the notification information is determined to be time critical, promptly forwards an alert of the notification information to a cell phone of the selected third entity, wherein the notification information is viewable in its most complete and current form on the cell phone of the selected third entity, with the cell phone including means for in-system response through the network by the selected third entity;
  provides an early warning system when the second computer system and cell phone are interconnected that informs the third entity that the second entity has transparency in that it does not participate in predatory practices or is registered as having an acceptable level of transparency, and also provides a visual symbol as a certification of such transparency to also provide the third entity with improved monitoring and risk management capabilities so that the third entity may safely communicate or respond to the alert; and
  receives a response to the notification information from an in-system response through the network by the selected third entity.

49. The apparatus of claim 48, further comprising the first computer system of the first entity that updates monitored information of the first entity.

* * * * *

UNITED STATES PATENT AND TRADEMARK OFFICE
CERTIFICATE OF CORRECTION

PATENT NO. : 10,192,265 B2  
APPLICATION NO. : 13/794234  
DATED : January 29, 2019  
INVENTOR(S) : Philip Carragher It is certified that error appears in the above-identified patent and that said Letters Patent is hereby corrected as shown below:

In the Claims

Column 16:  
Lines 31-32 (Claim 1, Lines 36-37), delete "or another entity other than the first or second".

Column 18:  
Line 29 (Claim 34, Line 1), delete "claim 19" and insert -- claim 21 --.  
Line 35 (Claim 36, Line 1), delete "claim 19" and insert -- claim 21 --.

Signed and Sealed this  
Ninth Day of April, 2019

Andrei Iancu  
*Director of the United States Patent and Trademark Office*